(12) United States Patent
Jeddeloh

(10) Patent No.: US 6,636,946 B2
(45) Date of Patent: Oct. 21, 2003

(54) SYSTEM AND METHOD FOR CACHING DATA BASED ON IDENTITY OF REQUESTOR

(75) Inventor: Joseph Jeddeloh, Minneapolis, MN (US)

(73) Assignee: Micron Technology, Inc., Boise, ID (US)

(*) Notice: Subject to any disclaimer, the term of this patent is extended or adjusted under 35 U.S.C. 154(b) by 162 days.

(21) Appl. No.: 09/805,663

(22) Filed: Mar. 13, 2001

(65) Prior Publication Data

US 2002/0133673 A1 Sep. 19, 2002

(51) Int. Cl.[7] .............................................. G06F 12/00
(52) U.S. Cl. ........................ 711/138; 711/141; 711/118; 711/119; 711/122; 704/104; 704/105
(58) Field of Search ................................. 711/138, 141, 711/118, 122; 709/104, 105

(56) References Cited

U.S. PATENT DOCUMENTS

| | | | | |
|---|---|---|---|---|
| 5,263,142 A | * | 11/1993 | Watkins et al. | 710/22 |
| 5,432,912 A | * | 7/1995 | Kihara | 710/30 |
| 5,740,380 A | | 4/1998 | LaBerge et al. | 395/287 |
| 5,805,835 A | | 9/1998 | Jeddeloh et al. | 395/287 |
| 5,860,109 A | * | 1/1999 | Hagersten et al. | 711/141 |
| 5,878,235 A | | 3/1999 | Porterfield et al. | 395/292 |
| 5,935,233 A | | 8/1999 | Jeddeloh | 710/129 |
| 5,978,872 A | | 11/1999 | Porterfield et al. | 710/100 |
| 5,991,843 A | | 11/1999 | Porterfield et al. | 710/112 |
| 5,991,855 A | | 11/1999 | Jeddeloh et al. | 711/146 |
| 6,018,792 A | | 1/2000 | Jeddeloh et al. | 711/146 |
| 6,046,952 A | * | 4/2000 | Novak et al. | 365/222 |
| 6,049,855 A | | 4/2000 | Jeddeloh | 711/157 |
| 6,145,040 A | | 11/2000 | LaBerge et al. | 710/107 |
| 6,157,398 A | | 12/2000 | Jeddeloh | 345/521 |
| 6,199,138 B1 | | 3/2001 | Jeddeloh | 711/105 |
| 6,202,133 B1 | | 3/2001 | Jeddeloh | 711/157 |
| 6,212,598 B1 | | 4/2001 | Jeddeloh | 711/105 |
| 6,252,612 B1 | | 6/2001 | Jeddeloh | 345/521 |
| 6,272,609 B1 | | 8/2001 | Jeddeloh | 711/169 |
| 6,275,913 B1 | | 8/2001 | Jeddeloh | 711/158 |
| 6,275,914 B1 | | 8/2001 | Jeddeloh | 711/158 |
| 6,295,592 B1 | | 9/2001 | Jeddeloh | 711/169 |
| 6,314,500 B1 | * | 11/2001 | Rose | 711/148 |
| 6,338,125 B1 | * | 1/2002 | Kopser et al. | 711/150 |
| 6,351,767 B1 | * | 2/2002 | Batchelder et al. | 709/219 |
| 6,463,510 B1 | * | 10/2002 | Jones et al. | 711/138 |
| 6,470,429 B1 | * | 10/2002 | Jones et al. | 711/138 |
| 6,480,951 B2 | * | 11/2002 | Porterfield | 711/206 |

* cited by examiner

Primary Examiner—Donald Sparks
Assistant Examiner—Ngoc Dinh
(74) Attorney, Agent, or Firm—Fish & Neave; Jeffrey H. Ingerman

(57) ABSTRACT

In a computer or microprocessor system having a plurality of resources making memory requests, a caching system includes a source tag generator which, depending on the embodiment, could reside in the requesting system resource, in a bus arbiter, or in a combination of a bus arbiter and a switch arbiter, or elsewhere. The system also includes cache control circuitry capable of using the source tag to make cacheability decisions. The cache control circuitry, and therefore the cacheability decisions, could be fixed—e.g., by a user—or could be alterable based on a suitable algorithm—similar, e.g., to a least-recently-used algorithm—that monitors cache usage and memory requests. The caching system is particularly useful where the cache being controlled is large enough to cache the results of I/O and similar requests and the requesting resources are I/O or similar resources outside the core logic chipset of the computer system.

77 Claims, 5 Drawing Sheets

SYSTEM AND METHOD FOR CACHING DATA BASED ON IDENTITY OF REQUESTOR

BACKGROUND OF THE INVENTION

This invention relates to the processing of memory requests in a computer system. More particularly, this invention relates to the caching of data based on the identity of the system resource making the memory request.

It is known to provide cache in computer systems to minimize the effects of memory latency. If the results of memory requests that are made frequently are stored in a cache memory adjacent to a central processing unit (CPU), the time necessary for any of those memory requests to be fulfilled is reduced. Thus, for example, in the case of a microprocessor used as the CPU in a personal computer, cache memory may advantageously be provided on-board the microprocessor chip, or in the core logic chipset that includes the microprocessor.

As memory has become less expensive and more available, additional and larger caches have become possible. Thus, in addition to the cache described above, which has come to be known as level-one, or L1, cache, it is known to provide level-two, or L2, cache at a somewhat greater distance from the CPU than the L1 cache; typically, L2 cache is also larger than the L1 cache. Because L2 cache is farther from the CPU than L1 cache, it may take longer for the CPU to access the L2 cache than the L1 cache. Moreover, because L2 cache is not expected to be as fast as L1 cache, the memory devices used for L2 cache may be slower than those used for L1 cache. As a result, L2 cache is used for the results of requests that are made less often, or whose arrival at the CPU is not as time critical.

It has now become known as well to provide a level-three, or L3, cache at an even greater distance from the CPU, either within the core logic chipset or elsewhere in the system (e.g., in the case of personal computer, on the motherboard).

L1 and, to some extent, L2, caches have been used primarily to cache memory requests made by the CPU itself. This has been because, first, it is axiomatic that CPU operation is central to all other system operations; if the CPU is slowed down, it cannot perform operations and direct other parts of the system. Second, cache size has heretofore been limited, and the results of CPU memory requests are typically small enough to fit within previously available caches.

When only CPU memory requests were cached, it normally was not necessary to determine whether or not a particular request should be cached. The results of all requests were typically cached, and logic, such as a least-recently-used routine, was used to determine, when the cache was full, which cached item should be deleted to make room for the next item to be cached.

With the advent of larger caches, such as those available as L3 cache, the caching of results of memory requests made by other system components such as input/output (I/O) components, which results tend to be larger than those of requests made by the CPU, becomes possible. However, if one is going to cache the results of memory requests by various system components, which are of less importance than the CPU, and which vary among themselves in level of importance, it becomes necessary to distinguish between requests whose results are to be cached and requests whose results are not to be cached.

SUMMARY OF THE INVENTION

In accordance with the present invention, caching decisions are facilitated by associating with each memory request an identification, or tag, of the system component that is the source of the memory request. The source tag can be used by the cache control logic to determine whether or not the results of a particular request should be cached. The cache control logic may be programmed to always, or never, cache the results of memory requests by particular components.

While the cache control logic could be fixed, an algorithm, similar to the least-recently-used routine referred to above, can be used to rewrite the cache control logic on the fly based on system conditions and changing memory usage patterns.

Thus, in accordance with the invention, a method is provided for caching data retrieved from memory in response to a request by a system resource in a computer system. Under the method, when a memory request is received from the system resource, a source tag, identifying the system resource, is appended to the memory request. The memory request is processed to determine, based on the source tag, whether the result of the memory request is to be cached.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 4 is a schematic representation of the cache control circuitry of the core logic chipset of FIG. 2;

DETAILED DESCRIPTION OF THE INVENTION

Figure 1:
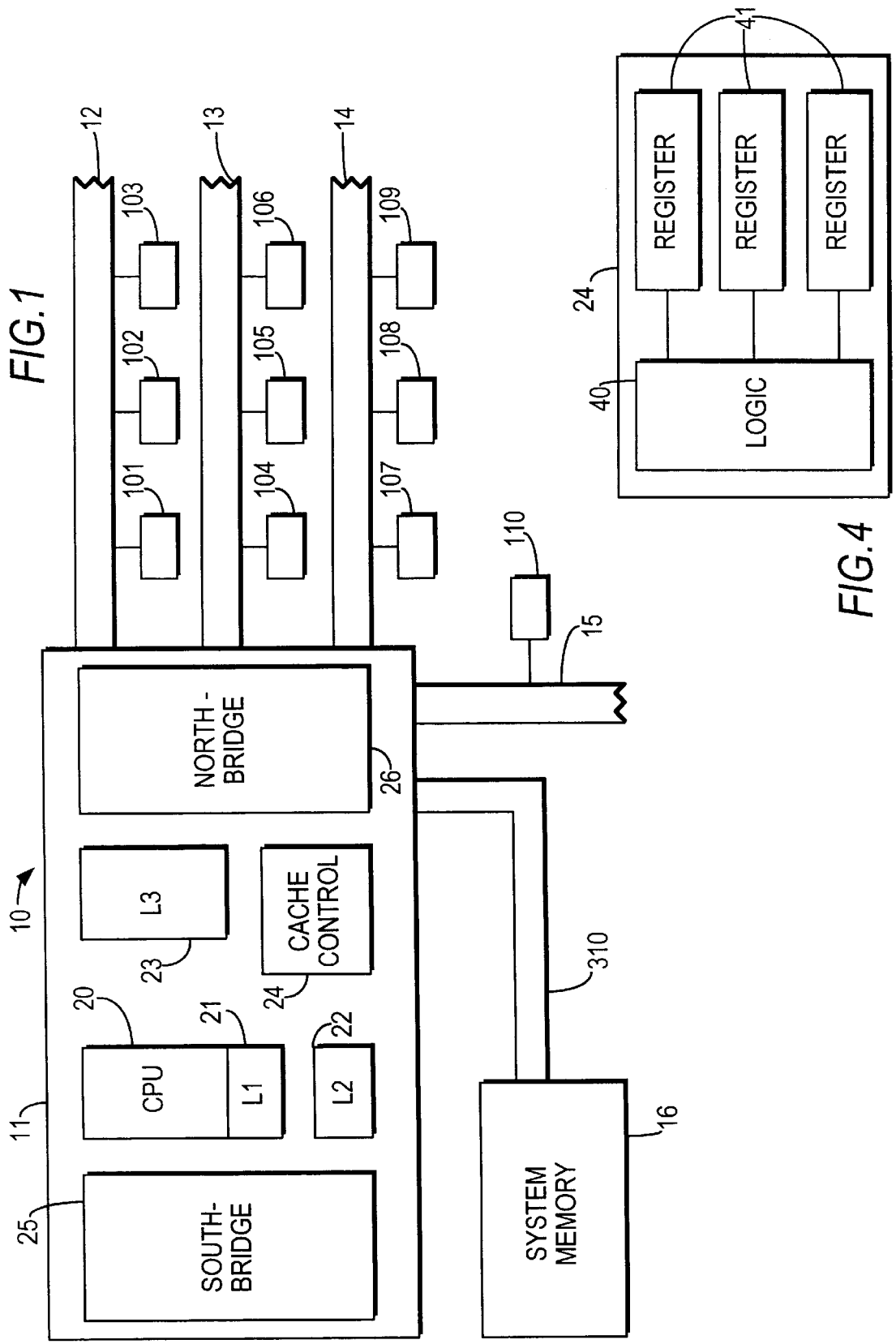
FIG. 1 is a schematic representation of a personal computer architecture.
Figure 2:
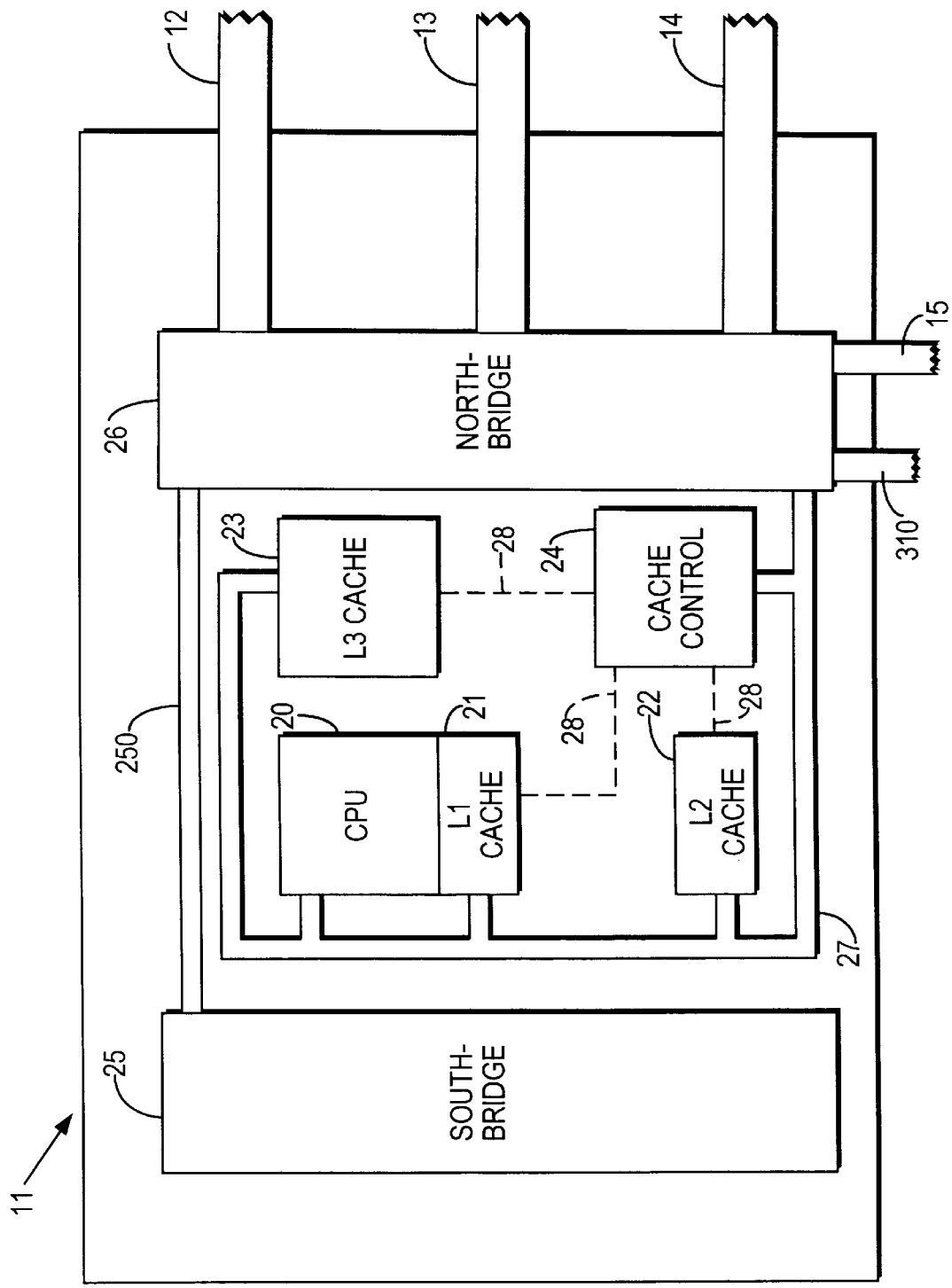
FIG. 2 is a schematic representation of the core logic chipset of the personal computer of FIG. 1.
Figure 3:
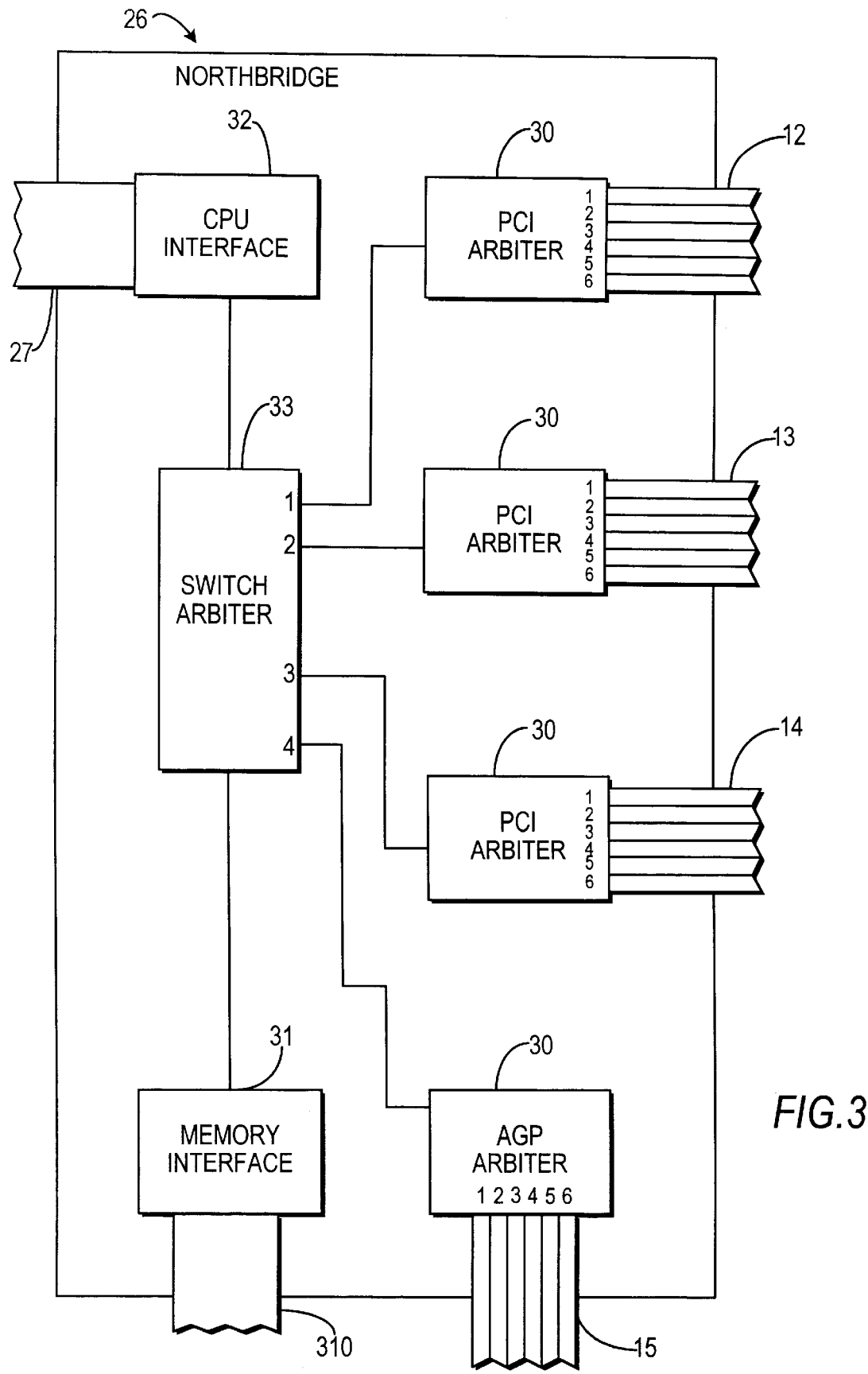
FIG. 3 is a schematic representation of the northbridge chip of the core logic chipset of FIG. 2.

As described above, the present invention allows "intelligent" choices to be made by cache control circuitry or software in deciding whether or not to cache the results of a memory request in a system where requests by resources other than the CPU are cached. The cache used to cache such requests may be, but need not be, an L3 cache. For example, in a personal computer system where a large cache is provided on the motherboard, with the intent that it function as L3 cache, but a core logic chipset is used that does not have L2 cache, then the cache on the motherboard would be L2 cache. Nevertheless, because it is large, that L2 cache could be used to cache the results of memory requests by multiple system resources, and the invention would apply. However, because of speed considerations, it is preferable that the cache with which the invention is used be provided on-board the core logic chipset, regardless of the level of the cache, as long it is large enough that the caching of I/O and other large requests from various system resources is possible (e.g., in the 8, 16 or even 32 megabyte range).

In accordance with the invention, a source tag is applied to memory requests made by resources in the class of resources the results of whose requests are to be cached. The source tag may be a separate message associated with the memory request. Alternatively, the source tag may be inserted into a field provided for that purpose in the memory request message itself. The source tag is used by cache control logic to determine whether or not to cache the results of that particular request. The source tag may be applied in a number of ways, and the cache control logic may use the source tag in a number of ways.

First, the requesting resource may on its own apply the source tag to the request. This requires additional intelligence, or at least the storing of an identifier, in the requesting resource, sufficient for the resource to send the separate message identifying itself as the requester, or to insert its identifier into the aforementioned field included for this purpose in the request.

Second, the source tag may be applied to the request by the routing system as the request is routed from the resource that made the request to the memory controller and the cache controller. A common topology may be that resources are located on particular buses, and more specifically on particular lines of particular buses. In such a topology, each of those buses accesses the core logic chipset through an arbiter, each resource has its own dedicated line into one of the arbiters, and all of the arbiters are connected to the CPU and the various controllers through a single switch arbiter, with each arbiter having its own dedicated line into the switch arbiter.

In one variant, no individual element knows its own identity, but based on its own inputs, it can identify the elements that communicate with it. Thus, an arbiter on a particular bus may not be able to identify itself, but may know that a request has been received from a resource on a particular conductor of that bus. The arbiter will pass the request on to the switch arbiter. The switch arbiter knows, by virtue of which of its own inputs the request was received on, which arbiter sent it the request. When the switch arbiter passes the request on to the cache controller, it adds the identity of the first arbiter. Thus, the request is now associated with a unique source tag that includes the bus conductor as determined by the first arbiter, and the first arbiter's identity as determined by the switch arbiter.

In another variant at the opposite extreme, the system resource itself has a unique identifier that it includes as a source tag directly in any request that it makes. This variant does not require anything of the arbiters or the switch arbiter. In an intermediate variant, the individual resources cannot identify themselves and must be identified by the respective arbiters, and in addition each arbiter can identify itself, and therefore the source tag is created exclusively at the arbiter level, without the need for any involvement by the switch arbiter.

After the tagged memory request has been processed and fulfilled, or while it is being processed and fulfilled, the cache controller also processes the request to determine whether or not the results, once returned, should be cached. One scheme or strategy for caching the results could be to cache all results, but to overwrite or delete already cached items based on which is least recently used, as is known. This scheme, which is based solely on the content of the data themselves, rather than on the identity of the system resource making the request, is known, would not rely on the source tag, and is not part of the present invention.

A caching scheme in accordance with the present invention, utilizing the source tag, could be based on preprogrammed instructions, stored in cache configuration registers, that requests by certain system resources should always, or never, be cached. According to such a scheme, if something must be deleted from the cache to make room for data that must be cached, the selection of which data to delete may be based on age, or on which data are least recently used.

In a variant of this caching scheme, instead of deleting items from the cache based on which item is least recently used, the cache controller could keep track of the "hit rate" for each item in the cache. If something must be deleted to make room for a new item to be cached, the item that has been accessed least frequently (rather than least recently) is deleted.

An alternative caching scheme in accordance with the present invention, utilizing the source tag, could be based on logic programmed into the cache controller. Such logic could be similar to a least-recently-used algorithm. As one example of such logic, instead of keeping track of which cached data were least recently used, the cache controller could keep track of which system resource has least recently made a memory request, giving requests made by that resource lowest priority for caching—i.e., once the cache is full, which happens soon after the system is started, not caching requests made by that resource.

In either of the aforementioned caching schemes, or in any caching scheme in accordance with the invention, each memory request may include a read/write identification. If so, then in accordance with the invention, only the results of requests with "read" identifications would be cached.

The invention will now be described with reference to FIGS. 1–6.

A computer system 10 with which the present invention may be used is preferably a personal computer, server or workstation including a core logic chipset 11. As is well-known, system 10 may include several PCI (Peripheral Component Interconnect) buses 12, 13, 14, connecting chipset 11 to peripheral devices 101–109, which may include storage and I/O devices. System 10 may also include an AGP (Accelerated Graphics Port) bus 15 serving peripheral device 110.

Core logic chipset 11 includes various components interconnected by a suitable host bus 27, including CPU 20 with associated L1 cache 21, additional L2 cache 22, L3 cache 23, and cache control circuitry 24. Cache control circuitry 24 may have separate direct communications 28 with the various caches. Chipset 11 also includes a northbridge chip 26, which connects CPU 20 to system memory and the PCI and AGP buses 12–15. Northbridge chip 26 is therefore the preferred location of the source tag generation according to the invention. Within northbridge chip 26 are preferably a plurality of bus arbiters 30, one for each of PCI and AGP buses 12–15. Northbridge chip 26 preferably also includes an interface 31 to system memory 16 via memory bus 310 and an interface 32 to CPU 20. A switch arbiter 33 connects the various bus arbiters 30 and interfaces 31, 32 to each other.

Chipset 11 further includes a southbridge chip 25, connected to northbridge chip 26 by internal PCI bus 250. Southbridge chip 25 typically controls an IDE (Integrated Drive Electronics) bus, a Universal Serial Bus (USB), plug-and-play support for peripheral devices, a keyboard/mouse controller, power management, and a bridge between PCI and ISA (Industry Standard Architecture) devices. The southbridge may also provide audio functions.

In one embodiment of the invention, each of peripheral devices 101–110 has a unique identification code. In this embodiment, when one of peripheral devices 101–110 makes a memory request, it includes that unique identification code in the request—e.g., as a distinct field within the same message as the request. The request is passed along one of buses 12–15, through one of bus arbiters 30 and then through switch arbiter 33 to memory interface 31 for retrieval of the data, and to CPU interface 32 for caching and for any operations called for.

Cache control circuit 24 reads the source tag, which includes the identification of the requesting system resource. Cache control circuit 24 preferably includes logic 40 and a number of cache control registers 41 which store the identifications of the resources whose requests should (or should not) be cached. As discussed above, those identifications could be stored in registers 40 by user design, using one of I/O devices 101–109 which could be, e.g., a keyboard. Alternatively, registers 40 could be rewritable by system 10 based on system conditions and changing memory usage patterns, as might be determined, for example, by a least-recently-used algorithm or similar algorithm. Thus, a page-based LRU-type algorithm could decide that a particular memory page or pages are being requested repeatedly by a single requestor whose requests are not being cached, and that therefore requests from that requester should be cached. Registers 40 could be updated to include the identification tag of that requester.

In another embodiment of the invention, each system resource that is a potential requestor is known by which bus it is located on, and which conductor on that bus serves it. In a first variant of this second embodiment, neither the requesting resource 101–110, nor the bus arbiter 30 serving the bus 12–15 on which it is located, has any intelligence with respect to its own identity, but bus arbiter 30 is capable of passing on the number of the conductor in its own bus that serves the requesting resource. Therefore, if resource 102 makes a memory request, that request travels along conductor 6 of bus 12 to bus arbiter 30 serving bus 12. Bus arbiter 30 is capable of "telling" switch arbiter 33 that the request originated on conductor 6 of the bus that it serves. Switch arbiter 33 knows which bus arbiter 30 passed the request to it because, as discussed above, preferably each bus arbiter 30 has its own dedicated line into the switch arbiter 33. Switch arbiter 33 needs no intelligence with respect to its own identity, because preferably the identity of the bus— which switch arbiter 33 knows because it knows which bus arbiter 30 passed the request, and the conductor on the bus—which bus arbiter 30 knows and passes along, are sufficient to form the source tag. Switch arbiter 33 preferably concatenates the source tag to the request message as a separate field or includes it in an associated message, and passes the message(s) to memory interface 31 and CPU interface 32, and caching decisions are made as above.

Figure 5:
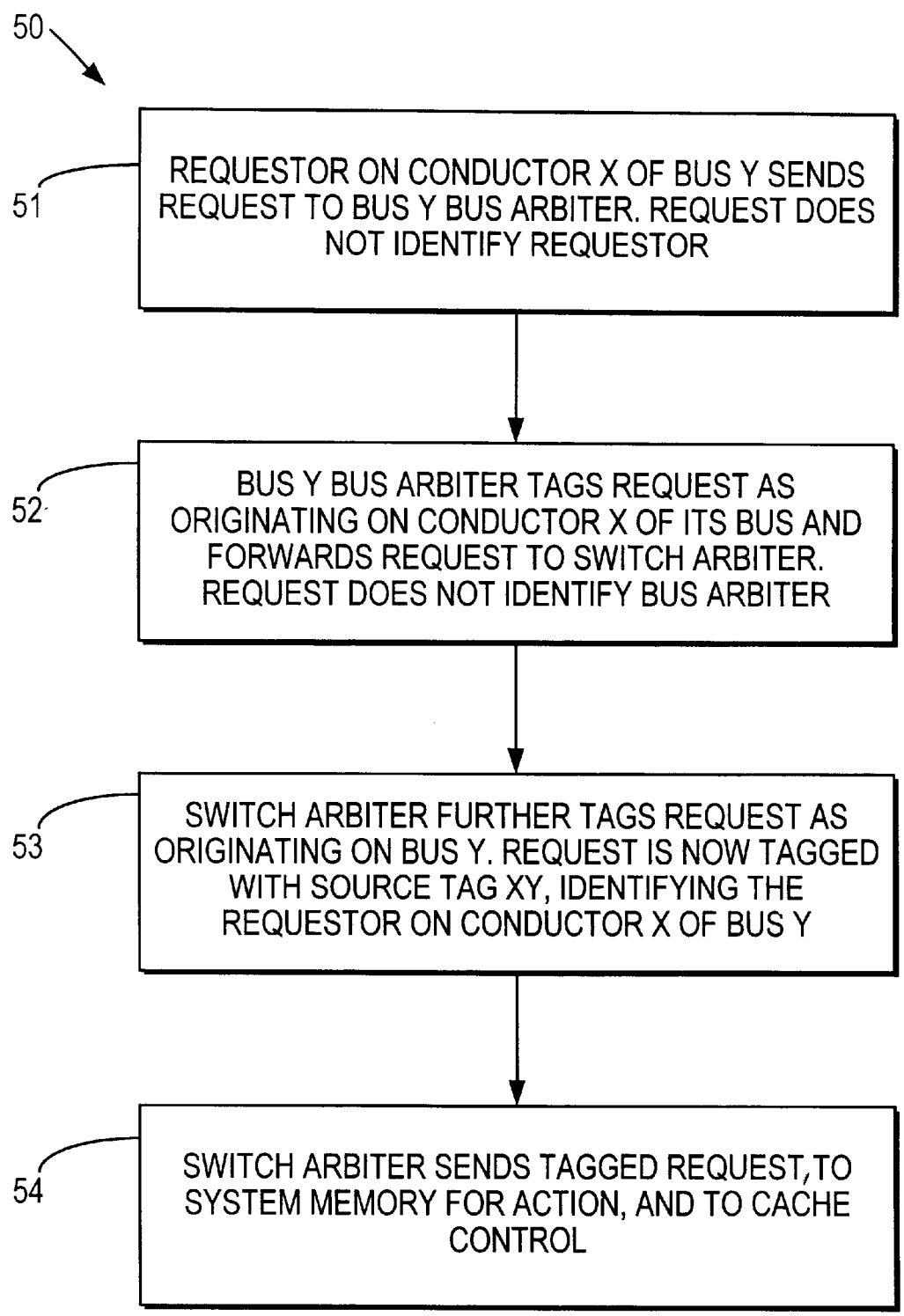
FIG. 5 is a flow chart of a preferred embodiment of the source tag creation process according to the invention.

This source tag generation portion of this variant 50 is diagramed in the flowchart of FIG. 5. At step 51, a requester located on conductor X of bus Y sends a memory request to the bus arbiter for bus Y. At step 52, the bus arbiter sends the request on to the switch arbiter along with a tag signifying that the request was received on conductor X of the bus arbiter's bus, which the bus arbiter determines because it "knows" which of its own inputs received the request and which bus conductor is on that input. The message from the bus arbiter to the switch arbiter does not identify the bus arbiter. At step 54, the switch arbiter sends the request on to the system memory for retrieval of the data requested, and to the cache control logic. At step 53, before sending the request to the cache control logic, the switch arbiter adds to the tag identifying conductor X the further identification of bus Y, which the switch arbiter determines because it "knows" which of its own inputs received the request and which bus arbiter is on that input (each bus arbiter, as discussed above, having a dedicated input to the switch arbiter). This concatenation of the X and Y identifiers produces the source tag according to the invention, which for purposes of this discussion can be written "XY," signifying the resource on the Xth conductor of the Yth bus.

Figure 6:
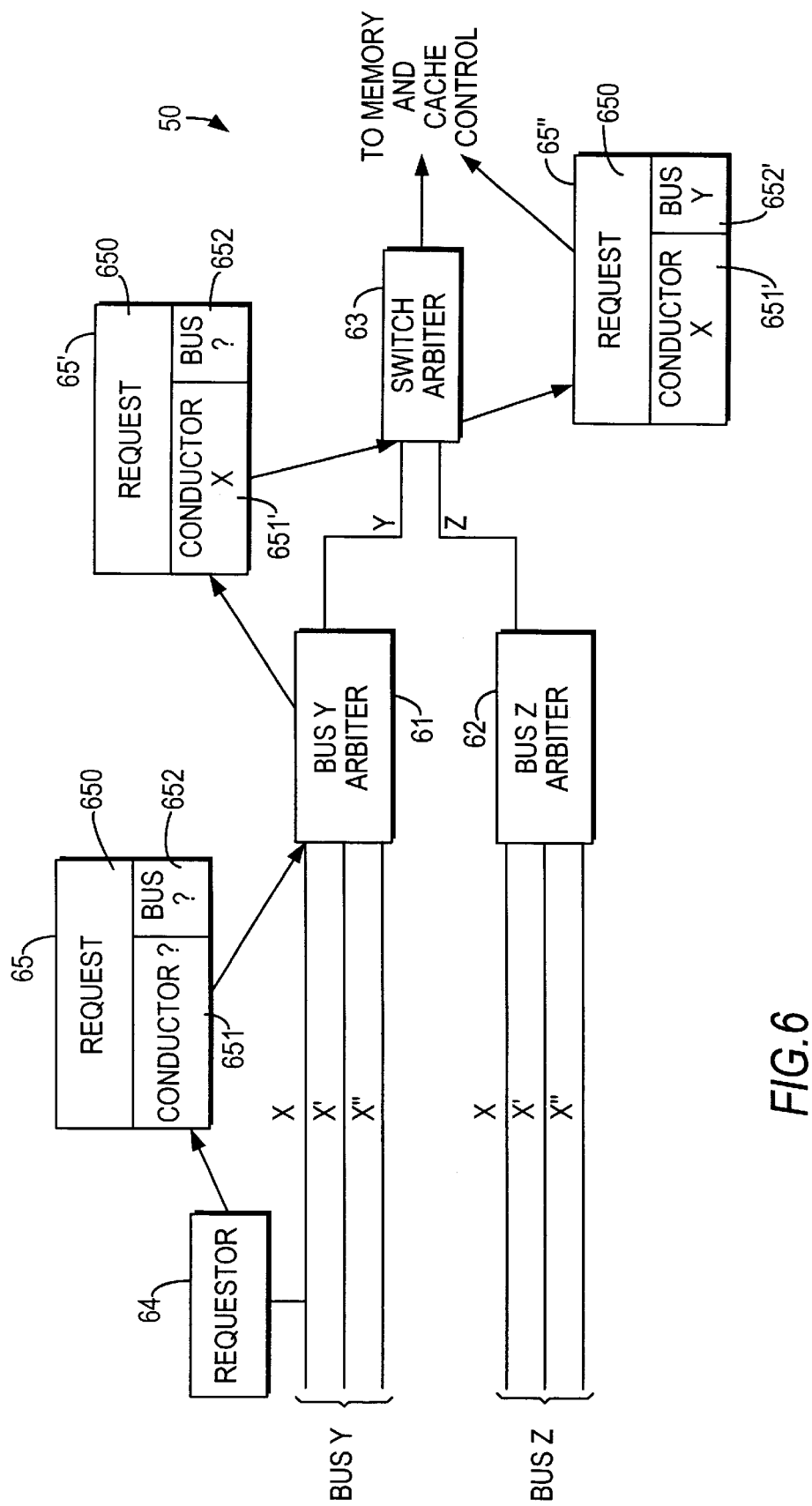
FIG. 6 is a diagrammatic illustration of the process of FIG. 5.

Process 50 is shown diagrammatically in FIG. 6. A system is shown having two buses, Y and Z, each of which has three conductors X, X' an X". Bus Y is controlled by bus arbiter 61 and bus Z is controlled by bus arbiter 62. Both bus arbiters 61, 62 are connected to switch arbiter 63. A requester 64, which is one of resources 101–110, is connected to conductor X of bus Y, makes or sends a memory request on to conductor X. The form of the request, as made, before it reaches bus Y arbiter 61, is indicated at 65, and includes a field or fields 650 for the request itself, as well a field 651 to identify the conductor and a field 652 to identify the bus. Both of fields 651 and 652 are empty or indeterminate at this point.

The request is passed from bus Y arbiter 61 to switch arbiter 63 in the form shown at 65' where, as can be seen, data has been entered field 651 (indicated as 651' to show that it now contains data) identifying conductor X, because bus Y arbiter 61 could "see" which conductor request 65 arrived on. However, field 652 remains empty, so conductor X is not uniquely identified. The request is passed from switch arbiter 63 to memory and to cache control (neither shown in FIG. 6) in the form shown at 65" where, as can be seen, data has now also been entered in field 652 (indicated as 652' to show that it now contains data) identifying bus Y, because switch arbiter 63 could "see" which conductor request 65' arrived on. The two fields 651', 652', or more correctly the combination of the data in those fields, added to the request as it travels through the hierarchy of system 10, make up the source tag according to the invention.

In a second variant of the second embodiment, bus arbiter 30 has intelligence with respect to its own identity. As in the first variant, it identifies the requesting resource by the conductor that serves it and uses that information along with its own identity (which corresponds to the bus identity) to construct the source tag, which it then either concatenates as a new field to the request message which it passes to switch arbiter 33, or sends as an associated message to switch arbiter 33. Switch arbiter 33 passes on the message(s), and caching decisions are made as above.

As seen in the described embodiments, a system according to the invention includes a source tag generator which, depending on the embodiment, could reside in the requesting system resource, in a bus arbiter, or in a combination of a bus arbiter and a switch arbiter. The system also includes cache control circuitry capable of using the source tag to make cacheability decisions. The cache control circuitry, and therefore the cacheability decisions, could be fixed— e.g., by a user—or could be alterable based on a suitable algorithm—e.g., a least-recently-used algorithm—that monitors cache usage and memory requests.

One skilled in the art will appreciate that the present invention can be practiced by other than the described embodiments, which are presented for purposes of illustration and not of limitation, and the present invention is limited only by the claims which follow.

What is claimed is:

1. A method for caching data retrieved from working memory of a computer system in response to a request by a system resource in said computer system, said method comprising:

receiving a memory request from said system resource;

appending a source tag, identifying said system resource, to said memory request;

processing said memory request to determine, based on said source tag, whether the result of said memory request is to be cached; and when said system resource making said memory request is an input/output resource, caching said result in a level-three cache.

2. A method for caching data retrieved from working memory of a computer system in response to a request by a system resource in said computer system, said method comprising:

receiving a memory request from said system resource;

appending a source tag, identifying said system resource, to said memory request;

processing said memory request to determine, based on said source tag, whether the result of said memory request is to be cached; wherein:
said processing comprises comparing said source tag to a stored list of source tags identifying resources whose requests should be cached.

3. The method of claim 2 wherein said stored list is entered by a system user.

4. The method of claim 2 wherein said stored list is determined in cache control circuitry by logic based on memory request patterns.

5. The method of claim 4 wherein said logic is a least-recently-used routine.

6. A method for caching data retrieved from working memory of a computer system in response to a request by a system resource in said computer system, said method comprising:

receiving a memory request from said system resource;

appending a source tag, identifying said system resource, to said memory request;

processing said memory request to determine, based on said source tag, whether the result of said memory request is to be cached; wherein:
said system resources are distributed in said system in a hierarchy;
said memory request travels through said hierarchy; and
said appending comprises adding respective portions of said tag at respective points as said memory request travels through said hierarchy.

7. The method of claim 6 wherein:

said hierarchy comprises a plurality of buses;

each of said system resources resides on one said bus;

each said bus is connected to a respective arbiter, and said arbiters are connected to a switch arbiter;

said appending comprises:
said arbiter adding to said memory request, as part of said source tag, a first identification of which resource on its bus initiated said memory request, and
said switch arbiter adding to said memory request, as part of said source tag, a second identification of which arbiter said memory request initiated on, said source tag comprising said first and second identifications.

8. The method of claim 6 wherein:

said hierarchy comprises a plurality of buses;

each of said system resources resides on one said bus;

each said bus is connected to a respective arbiter;

said appending comprises:
said arbiter adding to said memory request, as part of said source tag, a first identification of which resource on its bus initiated said memory request, said source tag comprising said first identification.

9. The method of claim 8 wherein said appending further comprises said arbiter adding to said memory request, as part of said source tag, a second identification of itself as arbiter on which said memory request initiated, said source tag further comprising said second identification.

10. A computer system comprising:

working memory;

a plurality of system resources submitting memory requests to said working memory;

source tag circuitry for adding to each said memory request a source tag that identifies which of said system resources has made said memory request;

cache control circuitry for determining, based on said source tag, whether the result of a particular memory request is to be cached; and a level-three cache; wherein:
when said system resource making said memory request is an input/output resource, said result is cached in said level-three cache.

11. The computer system of claim 10 wherein:

said cache control circuitry comprises registers storing a list of source tags identifying system resources the results of whose memory requests are to be cached.

12. The computer system of claim 11 wherein said list is entered in said registers by a system user.

13. The computer system of claim 11 wherein said stored list is determined in said cache control circuitry by logic based on memory request patterns.

14. The computer system of claim 13 wherein said logic implements a least-recently-used routine.

15. The computer system of claim 10 wherein:

each said system resource has a unique identifier; and said source tag circuitry appends said unique identifier of said system resource to each said memory request initiated by said system resource.

16. The computer system of claim 10 wherein:

said system resources are distributed in said system in a hierarchy;

said system includes switch elements through which said memory request travels between levels of said hierarchy; and each of said switch elements adds a respective portion of said tag at respective points as said memory request travels through said hierarchy.

17. The computer system of claim 16 wherein:

said hierarchy comprises a plurality of buses;

each of said system resources resides on one said bus;

each said bus is connected to a respective arbiter, and said arbiters are connected to a switch arbiter;

each said arbiter adds to said memory request, as part of said source tag, a first identification of which resource on its bus initiated said memory request, and said switch arbiter adds to said memory request, as part of said source tag, a second identification of which arbiter said memory request initiated on, said source tag comprising said first and second identifications.

18. The computer system of claim 16 wherein:

said hierarchy comprises a plurality of buses;

each of said system resources resides on one said bus;

each said bus is connected to a respective arbiter;

each said arbiter adds to said memory request, as part of said source tag, a first identification of which resource on its bus initiated said memory request, said source tag comprising said first identification.

19. The computer system of claim 18 wherein each said arbiter further adds to said memory request, as part of said source tag, a second identification of itself as arbiter on which said memory request initiated, said source tag further comprising said second identification.

20. A computer system comprising:

working memory;

a plurality of system resources submitting memory requests to said working memory;

source tag circuitry for adding to each said memory request a source tag that identifies which of said system resources has made said memory request; and cache control circuitry for determining, based on said source tag, whether the result of a particular memory request is to be cached; wherein:

said cache control circuitry comprises registers storing a list of source tags identifying system resources the results of whose memory requests are to be cached.

21. The computer system of claim 20 wherein said list is entered in said registers by a system user.

22. The computer system of claim 20 wherein said stored list is determined in said cache control circuitry by logic based on memory request patterns.

23. The computer system of claim 22 wherein said logic implements a least-recently-used routine.

24. A computer system comprising:

working memory;

a plurality of system resources submitting memory requests to said working memory;

source tag circuitry for adding to each said memory request a source tag that identifies which of said system resources has made said memory request; and cache control circuitry for determining, based on said source tag, whether the result of a particular memory request is to be cached; wherein:

said system resources are distributed in said system in a hierarchy;

said system includes switch elements through which said memory request travels between levels of said hierarchy; and each of said switch elements adds a respective portion of said tag at respective points as said memory request travels through said hierarchy.

25. The computer system of claim 24 wherein:

said hierarchy comprises a plurality of buses;

each of said system resources resides on one said bus;

each said bus is connected to a respective arbiter, and said arbiters are connected to a switch arbiter;

each said arbiter adds to said memory request, as part of said source tag, a first identification of which resource on its bus initiated said memory request, and said switch arbiter adds to said memory request, as part of said source tag, a second identification of which arbiter said memory request initiated on, said source tag comprising said first and second identifications.

26. The computer system of claim 24 wherein:

said hierarchy comprises a plurality of buses;

each of said system resources resides on one said bus;

each said bus is connected to a respective arbiter;

each said arbiter adds to said memory request, as part of said source tag, a first identification of which resource on its bus initiated said memory request, said source tag comprising said first identification.

27. The computer system of claim 26 wherein each said arbiter further adds to said memory request, as part of said source tag, a second identification of itself as arbiter on which said memory request initiated, said source tag further comprising said second identification.

28. A logic chipset for use in a computer system, said computer system having at least one system resource on at least one bus, and having working memory of which said at least one system resource makes requests, said chipset comprising:

a microprocessor chip; and an interface chip for communicating between said microprocessor chip and said at least one bus;

source tag circuitry on said interface chip for adding to each said memory request a source tag that identifies which of said system resources has made said memory request; and cache control circuitry for determining, based on said source tag, whether the result of a particular memory request is to be cached; wherein:

said cache control circuitry comprises registers storing a list of source tags identifying system resources the results of whose memory requests are to be cached.

29. The logic chipset of claim 28 wherein said list is entered in said registers by a user of said system.

30. The logic chipset of claim 28 wherein said stored list is determined in said cache control circuitry by logic based on memory request patterns.

31. The logic chipset of claim 30 wherein said logic implements a least-recently-used routine.

32. A logic chipset for use in a computer system, said computer system having at least one system resource on at least one bus, and having working memory of which said at least one system resource makes requests, said chipset comprising:

a microprocessor chip; and an interface chip for communicating between said microprocessor chip and said at least one bus;

source tag circuitry on said interface chip for adding to each said memory request a source tag that identifies which of said system resources has made said memory request; and cache control circuitry for determining, based on said source tag, whether the result of a particular memory request is to be cached; wherein:

said system resources are distributed in said system in a hierarchy;

said interface chip includes switch elements through which said memory request travels between levels of said hierarchy; and said source tag circuitry comprises said switch elements, each of said switch elements adding a respective portion of said tag at respective points as said memory request travels through said hierarchy.

33. The logic chipset of claim 32 wherein:

said hierarchy comprises a plurality of said at least one bus;

each of said system resources resides on one said bus;

each said bus is connected to a respective arbiter, and said arbiters are connected to a switch arbiter, said switch elements comprising said arbiters and said switch arbiter;

each said arbiter adds to said memory request, as part of said source tag, a first identification of which resource on its bus initiated said memory request, and said switch arbiter adds to said memory request, as part of said source tag, a second identification of which arbiter said memory request initiated on, said source tag comprising said first and second identifications.

34. The logic chipset of claim 32 wherein:

said hierarchy comprises a plurality of said at least one bus;

each of said system resources resides on one said bus;

each said bus is connected to a respective arbiter, said switch elements comprising each said arbiter;

each said arbiter adds to said memory request, as part of said source tag, a first identification of which resource on its bus initiated said memory request, said source tag comprising said first identification.

35. The logic chipset of claim 34 wherein each said arbiter further adds to said memory request, as part of said source tag, a second identification of itself as arbiter on which said memory request initiated, said source tag further comprising said second identification.

36. A logic chipset for use in a computer system, said computer system having at least one system resource on at least one bus, and having working memory of which said at least one system resource makes requests, said chipset comprising:

a microprocessor chip; and an interface chip for communicating between said microprocessor chip and said at least one bus;

source tag circuitry on said interface chip for adding to each said memory request a source tag that identifies which of said system resources has made said memory request; and cache control circuitry for determining, based on said source tag, whether the result of a particular memory request is to be cached; wherein:

said interface chip is a northbridge chip; and said cache control circuitry comprises registers storing a list of source tags identifying system resources the results of whose memory requests are to be cached.

37. The logic chipset of claim 36 wherein said list is entered in said registers by a user of said system.

38. The logic chipset of claim 36 wherein said stored list is determined in said cache control circuitry by logic based on memory request patterns.

39. The logic chipset of claim 36 wherein said logic implements a least-recently-used routine.

40. A logic chipset for use in a computer system, said computer system having at least one system resource on at least one bus, and having working memory of which said at least one system resource makes requests, said chipset comprising:

a microprocessor chip; and an interface chip for communicating between said microprocessor chip and said at least one bus;

source tag circuitry on said interface chip for adding to each said memory request a source tag that identifies which of said system resources has made said memory request; and cache control circuitry for determining, based on said source tag, whether the result of a particular memory request is to be cached; wherein:

said interface chip is a northbridge chip;

said system resources are distributed in said system in a hierarchy;

said interface chip includes switch elements through which said memory request travels between levels of said hierarchy; and said source tag circuitry comprises said switch elements, each of said switch elements adding a respective portion of said tag at respective points as said memory request travels through said hierarchy.

41. The logic chipset of claim 40 wherein:

said hierarchy comprises a plurality of said at least one bus;

each of said system resources resides on one said bus;

each said bus is connected to a respective arbiter, and said arbiters are connected to a switch arbiter, said switch elements comprising said arbiters and said switch arbiter;

each said arbiter adds to said memory request, as part of said source tag, a first identification of which resource on its bus initiated said memory request, and said switch arbiter adds to said memory request, as part of said source tag, a second identification of which arbiter said memory request initiated on, said source tag comprising said first and second identifications.

42. The logic chipset of claim 40 wherein:

said hierarchy comprises a plurality of said at least one bus;

each of said system resources resides on one said bus;

each said bus is connected to a respective arbiter, said switch elements comprising each said arbiter;

each said arbiter adds to said memory request, as part of said source tag, a first identification of which resource on its bus initiated said memory request, said source tag comprising said first identification.

43. The logic chipset of claim 42 wherein each said arbiter further adds to said memory request, as part of said source tag, a second identification of itself as arbiter on which said memory request initiated, said source tag further comprising said second identification.

44. A computer system comprising:

working memory means;

a plurality of system resources submitting memory requests to said working memory means;

source tag means for adding to each said memory request a source tag that identifies which of said system resources has made said memory request;

cache control means for determining, based on said source tag, whether the result of a particular memory request is to be cached; and a level-three cache; wherein:

when said system resource making said memory request is an input/output resource, said result is cached in said level-three cache.

45. The computer system of claim 44 wherein:

said cache control means comprises register means storing a list of source tags identifying system resources the results of whose memory requests are to be cached.

46. The computer system of claim 45 wherein said list is entered in said register means by a system user.

47. The computer system of claim 45 wherein said stored list is determined in said cache control means by logic means based on memory request patterns.

48. The computer system of claim 47 wherein said logic means implements a least-recently-used routine.

49. The computer system of claim 44 wherein:

each said system resource has a unique identifier; and said source tag means appends said unique identifier of said system resource to each said memory request initiated by said system resource.

50. The computer system of claim 44 wherein:

said system resources are distributed in said system in a hierarchy;

said system includes switch means through which said memory request travels between levels of said hierarchy; and each of said switch means adds a respective portion of said tag at respective points as said memory request travels through said hierarchy.

51. The computer system of claim 50 wherein:

said hierarchy comprises a plurality of bus means;

each of said system resources resides on one said bus means;

each said bus means is connected to a respective arbiter means, and said arbiter means are connected to switch arbiter means;

each said arbiter means adds to said memory request, as part of said source tag, a first identification of which resource on its bus initiated said memory request, and said switch arbiter means adds to said memory request, as part of said source tag, a second identification of which arbiter said memory request initiated on, said source tag comprising said first and second identifications.

52. The computer system of claim 50 wherein:

said hierarchy comprises a plurality of bus means;

each of said system resources resides on one said bus means;

each said bus means is connected to a respective arbiter means;

each said arbiter means adds to said memory request, as part of said source tag, a first identification of which resource on its bus means initiated said memory request, said source tag comprising said first identification.

53. The computer system of claim 52 wherein each said arbiter means further adds to said memory request, as part of said source tag, a second identification of itself as arbiter means on which said memory request initiated, said source tag further comprising said second identification.

54. A computer system comprising:

working memory means;

a plurality of system resources submitting memory requests to said working memory means;

source tag means for adding to each said memory request a source tag that identifies which of said system resources has made said memory request; and cache control means for determining, based on said source tag, whether the result of a particular memory request is to be cached; wherein:

said cache control means comprises registers storing a list of source tags identifying system resources the results of whose memory requests are to be cached.

55. The computer system of claim 54 wherein said list is entered in said register means by a system user.

56. The computer system of claim 54 wherein said stored list is determined in said cache control means by logic means based on memory request patterns.

57. The computer system of claim 56 wherein said logic means implements a least-recently-used routine.

58. A computer system comprising:

working memory means;

a plurality of system resources submitting memory requests to said working memory means;

source tag means for adding to each said memory request a source tag that identifies which of said system resources has made said memory request; and cache control means for determining, based on said source tag, whether the result of a particular memory request is to be cached; wherein:

said system resources are distributed in said system in a hierarchy;

said system includes switch means through which said memory request travels between levels of said hierarchy; and each of said switch means adds a respective portion of said tag at respective points as said memory request travels through said hierarchy.

59. The computer system of claim 58 wherein:

said hierarchy comprises a plurality of bus means;

each of said system resources resides on one said bus means;

each said bus means is connected to a respective arbiter means, and said arbiter means are connected to switch arbiter means;

each said arbiter means adds to said memory request, as part of said source tag, a first identification of which resource on its bus means initiated said memory request, and said switch arbiter means adds to said memory request, as part of said source tag, a second identification of which arbiter means said memory request initiated on, said source tag comprising said first and second identifications.

60. The computer system of claim 58 wherein:

said hierarchy comprises a plurality of bus means;

each of said system resources resides on one said bus means;

each said bus means is connected to a respective arbiter means;

each said arbiter means adds to said memory request, as part of said source tag, a first identification of which resource on its bus means initiated said memory request, said source tag comprising said first identification.

61. The computer system of claim 60 wherein each said arbiter means further adds to said memory request, as part of said source tag, a second identification of itself as arbiter means on which said memory request initiated, said source tag further comprising said second identification.

62. A logic chipset for use in a computer system, said computer system having at least one system resource on at least one bus means, and having working memory means of which said at least one system resource makes requests, said chipset comprising:

microprocessor chip means; and interface chip means for communicating between said microprocessor chip means and said at least one bus means;

source tag means on said interface chip means for adding to each said memory request a source tag that identifies which of said system resources has made said memory request; and cache control means for determining, based on said source tag, whether the result of a particular memory request is to be cached; wherein:

said cache control means comprises register means storing a list of source tags identifying system resources the results of whose memory requests are to be cached.

63. The logic chipset of claim 62 wherein said list is entered in said register means by a user of said system.

64. The logic chipset of claim 62 wherein said stored list is determined in said cache control means by logic means based on memory request patterns.

65. The logic chipset of claim 64 wherein said logic means implements a least-recently-used routine.

66. A logic chipset for use in a computer system, said computer system having at least one system resource on at least one bus means, and having working memory means of which said at least one system resource makes requests, said chipset comprising:

microprocessor chip means; and interface chip means for communicating between said microprocessor chip means and said at least one bus means;

source tag means on said interface chip means for adding to each said memory request a source tag that identifies which of said system resources has made said memory request; and cache control means for determining, based on said source tag, whether the result of a particular memory request is to be cached; wherein:

said system resources are distributed in said system in a hierarchy;

said interface chip means includes switch means through which said memory request travels between levels of said hierarchy; and said source tag means comprises said switch means, each of said switch means adding a respective portion of said tag at respective points as said memory request travels through said hierarchy.

67. The logic chipset of claim 66 wherein:

said hierarchy comprises a plurality of said at least one bus means;

each of said system resources resides on one said bus means;

each said bus means is connected to a respective arbiter means, and said arbiter means are connected to switch arbiter means, said switch means comprising said arbiter means and said switch arbiter means;

each said arbiter means adds to said memory request, as part of said source tag, a first identification of which resource on its bus means initiated said memory request, and said switch arbiter means adds to said memory request, as part of said source tag, a second identification of which arbiter said memory request initiated on, said source tag comprising said first and second identifications.

68. The logic chipset of claim 66 wherein:

said hierarchy comprises a plurality of said at least one bus means;

each of said system resources resides on one said bus means;

each said bus means is connected to a respective arbiter means, said switch means comprising each said arbiter means;

each said arbiter means adds to said memory request, as part of said source tag, a first identification of which resource on its bus initiated said memory request, said source tag comprising said first identification.

69. The logic chipset of claim 68 wherein each said arbiter means further adds to said memory request, as part of said source tag, a second identification of itself as arbiter means on which said memory request initiated, said source tag further comprising said second identification.

70. A logic chipset for use in a computer system, said computer system having at least one system resource on at least one bus means, and having working memory means of which said at least one system resource makes requests, said chipset comprising:

microprocessor chip means; and interface chip means for communicating between said microprocessor chip means and said at least one bus means;

source tag means on said interface chip means for adding to each said memory request a source tag that identifies which of said system resources has made said memory request; and cache control means for determining, based on said source tag, whether the result of a particular memory request is to be cached; wherein:

said interface chip means is a northbridge chip;

said cache control means comprises register means storing a list of source tags identifying system resources the results of whose memory requests are to be cached.

71. The logic chipset of claim 70 wherein said list is entered in said register means by a user of said system.

72. The logic chipset of claim 70 wherein said stored list is determined in said cache control means by logic means based on memory request patterns.

73. The logic chipset of claim 72 wherein said logic means implements a least-recently-used routine.

74. A logic chipset for use in a computer system, said computer system having at least one system resource on at least one bus means, and having working memory means of which said at least one system resource makes requests, said chipset comprising:

microprocessor chip means; and interface chip means for communicating between said microprocessor chip means and said at least one bus means;

source tag means on said interface chip means for adding to each said memory request a source tag that identifies which of said system resources has made said memory request; and cache control means for determining, based on said source tag, whether the result of a particular memory request is to be cached; wherein:

said interface chip means is a northbridge chip;

said system resources are distributed in said system in a hierarchy;

said interface chip means includes switch means through which said memory request travels between levels of said hierarchy; and said source tag means comprises said switch means, each of said switch means adding a respective portion of said tag at respective points as said memory request travels through said hierarchy.

75. The logic chipset of claim 74 wherein:

said hierarchy comprises a plurality of said at least one bus means;

each of said system resources resides on one said bus means;

each said bus means is connected to a respective arbiter means, and said arbiter means are connected to a switch arbiter means, said switch means comprising said arbiter means and said switch arbiter means;

each said arbiter means adds to said memory request, as part of said source tag, a first identification of which resource on its bus means initiated said memory request, and said switch arbiter means adds to said memory request, as part of said source tag, a second identification of which arbiter means said memory request initiated on, said source tag comprising said first and second identifications.

76. The logic chipset of claim 74 wherein:

said hierarchy comprises a plurality of said at least one bus means;

each of said system resources resides on one said bus means;

each said bus means is connected to a respective arbiter means, said switch means comprising each said arbiter means;

each said arbiter means adds to said memory request, as part of said source tag, a first identification of which resource on its bus means initiated said memory request, said source tag comprising said first identification.

77. The logic chipset of claim 76 wherein each said arbiter means further adds to said memory request, as part of said source tag, a second identification of itself as arbiter means on which said memory request initiated, said source tag further comprising said second identification.

* * * * *